US009338654B2

(12) United States Patent
Moore et al.

(10) Patent No.: US 9,338,654 B2
(45) Date of Patent: May 10, 2016

(54) CONTROLLING ACCESS TO COMMUNICATION SERVICES

(75) Inventors: Tiffany A. Moore, Omaha, NE (US); John I Ayers, Omaha, NE (US); Mark A. Montz, Elkhorn, NE (US); Mark R. Nielson, Elkhorn, NE (US); Anders H. Askerup, Omaha, NE (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 13/350,485

(22) Filed: Jan. 13, 2012

(65) Prior Publication Data

US 2012/0115466 A1    May 10, 2012

Related U.S. Application Data

(63) Continuation of application No. 11/131,311, filed on May 18, 2005, now Pat. No. 8,116,764.

(51) Int. Cl.
*H04W 12/08*     (2009.01)
*H04L 29/06*     (2006.01)

(52) U.S. Cl.
CPC .............. *H04W 12/08* (2013.01); *H04L 63/102* (2013.01)

(58) Field of Classification Search
CPC ........... H04W 8/18; H04W 8/06; H04W 8/26; H04W 8/183; H04W 8/12; H04W 48/18; H04W 48/16
USPC .................................... 455/432.1, 432.3, 433
See application file for complete search history.

(56) References Cited

U.S. PATENT DOCUMENTS

| 5,577,103 | A  |   | 11/1996 | Foti et al. |
| 6,032,044 | A  | * | 2/2000  | Shannon et al. ............... 455/433 |
| 6,529,732 | B1 | * | 3/2003  | Vainiomaki et al. .......... 455/433 |
| 6,556,823 | B2 |   | 4/2003  | Clapton et al. |
| 6,603,969 | B1 |   | 8/2003  | Vuoristo et al. |
| 7,610,062 | B2 |   | 10/2009 | Beeman et al. |

(Continued)

FOREIGN PATENT DOCUMENTS

CN         1286876 A      3/2001

OTHER PUBLICATIONS

3GPP TS 23.008—"Organisation of Subscriber Data"—version 6.5.0 Release 6—Mar. 2005—70 pags—ETSI TS 123 008.

(Continued)

*Primary Examiner* — Marisol Figueroa
(74) *Attorney, Agent, or Firm* — Hauptman Ham, LLP

(57) ABSTRACT

A method and corresponding apparatus and system of controlling access to communication services by a roaming wireless device are described. The method includes receiving a request for roaming wireless device service information related to a roaming user and determining which services the user has access to for the requesting system, if the user is determined to have access to the requesting system. The method also includes transmitting user service information concerning the services to which the user has access. The apparatus includes a memory, a communication system, and a processor. The memory stores: (1) user information including a class of service (COS) identifier and (2) COS restriction information. The processing system, coupled with the communication system and the memory, generates a reply message based on comparing information in a service request message received by the communication system with the stored information in the memory.

11 Claims, 13 Drawing Sheets

(56) References Cited

U.S. PATENT DOCUMENTS

| | | | |
|---|---|---|---|
| 8,116,764 B2* | 2/2012 | Moore et al. | 455/432.1 |
| 2001/0036164 A1* | 11/2001 | Kakemizu et al. | 370/331 |
| 2004/0192297 A1 | 9/2004 | Erskine et al. | |
| 2005/0059430 A1 | 3/2005 | Beeman et al. | |

OTHER PUBLICATIONS

3rd Generation Partnership Project V6.5.0—Technical Specification—Mar. 2005—pp. 1-14.
CN Office Action dated Jan. 12, 2011 with English translation attached.
CN Office Action dated Jan. 22, 2010 with English translation attached.
CN Office Action dated Jul. 17, 2009 with English translation attached.
CN1286876A—dated Nov. 3, 1998.
English translation—CN1286876—Service to Mobile Stations—Filing Date Nov. 3, 1998—pp. 1-10.
EP Extended Search Report—dated Jun. 4, 2006.
EP Office Action—dated Aug. 2, 2010.
EP Office Action—dated Dec. 28, 2010.
ETSI GSM—R Global For Mobile Communications Digital Cellular Telecommunications System (Phase 2+);—version 5.2.0—vol. SMG1 No. 520—Nov. 1997—pp. 1-15.

* cited by examiner

400

401

COS ID: 0001 — 302
— 304
Nature of Address Indicator: . - Any Nature of Address ▼
Numbering Plan Indicator: . - Any Numbering Plan ▼
306
Digit Pattern: 1.
308

310 ☑ Allow the Address

Restriction: 0 - Not Restricted ▼
ODB COS Name: 312
314
402

COS ID: 0001 — 302
— 304
Nature of Address Indicator: [ . - Any Nature of Address ▼ ]
Numbering Plan Indicator: [ . - Any Numbering Plan ▼ ]
306
Digit Pattern: [ 1. ]
308

310 ☐ Allow the Address

Restriction: [ 0 - Not Restricted ▼ ]
ODB COS Name: [ ]
312
314

COS ID: 0001 — 302
— 304
Nature of Address Indicator: [ . - Any Nature of Address ▼]
Numbering Plan Indicator: [ . - Any Numbering Plan ▼]
306
Digit Pattern: [ 1. ]
308

310 — ☑ Allow the Address
— 312
Restriction: [ 0 - Not Restricted ▼ ]
0 - Not Restricted
ODB COS Name: 1 - Do Not Send CAMEL Data
2 - Restrict Service via ODB COS
3 - Do Not Send CAMEL Data &
402   Restrict Service via ODB COS

COS ID: 0001 — 302
— 304
Nature of Address Indicator: [ . - Any Nature of Address ▼ ]
Numbering Plan Indicator: [ . - Any Numbering Plan ▼ ]
306
Digit Pattern: [ 1. ]
308

310 ☑ Allow the Address

Restriction: [ 3 - Do Not Send CAMEL Data & Restrict Service via ODB COS ▼ ]
ODB COS Name: [ deny ]
312
314
402

ODB COS ID: deny (314)

| ODB Incoming Data (803) | ODB General Data (804) | ODB Barring Data (805) | Operator Controlled (806) |
|---|---|---|---|
| ☑ Specific Type 1 | ☑ Specific Type 9 | ☑ Specific Type 17 | ☑ Specific Type 25 |
| ☐ Specific Type 2 | ☐ Specific Type 10 | ☐ Specific Type 18 | ☐ Specific Type 26 |
| ☐ Specific Type 3 | ☐ Specific Type 11 | ☐ Specific Type 19 | ☐ Specific Type 27 |
| ☐ Specific Type 4 | ☐ Specific Type 12 | ☐ Specific Type 20 | ☐ Specific Type 28 |
| ☑ Specific Type 5 | ☑ Specific Type 13 | ☑ Specific Type 21 | ☑ Specific Type 29 |
| ☐ Specific Type 6 | ☐ Specific Type 14 | ☐ Specific Type 22 | ☐ Specific Type 30 |
| ☐ Specific Type 7 | ☐ Specific Type 15 | ☐ Specific Type 23 | ☐ Specific Type 31 |
| ☐ Specific Type 8 | ☐ Specific Type 16 | ☐ Specific Type 24 | ☐ Specific Type 32 |

800 / 801 / 1000

CONTROLLING ACCESS TO COMMUNICATION SERVICES

CLAIM FOR PRIORITY

This application is a continuation application of co-pending U.S. patent application Ser. No. 11/131,311, filed on May 18, 2005, which is hereby incorporated by reference in its entirety.

FIELD OF THE INVENTION

The present invention relates to controlling access to communication services.

BACKGROUND

Wireless telecommunication carriers, e.g., Sprint, Nextel, Cingular, and other carriers, provide wireless telecommunication services to users using wireless devices by way of communication protocols, e.g., GSM, CDMA, and other wireless protocols. A user is a subscriber of a wireless telecommunication service offered by a wireless telecommunication carrier.

A coverage area refers to a geographic region within which a user obtains wireless telecommunication service from a wireless telecommunication carrier. Telecommunication carrier coverage areas are further divided into home coverage areas and roaming coverage areas. A home coverage area specifies a home region for the user, e.g., a single cellular region for a user. A roaming coverage area includes all other coverage areas outside the home coverage area. The roaming coverage area may include cellular regions outside the home coverage area on a particular carrier and may include cellular coverage provided by a different telecommunication carrier.

In order to provide telecommunication services to a user while the user is in a roaming coverage area, the roaming coverage area telecommunication system communicates with the home coverage area telecommunication system to determine whether to provide service to the user. If the user is determined to have roaming service capabilities, the roaming coverage area telecommunication system provides service to the user while the user is in the roaming coverage area.

FIELD OF THE INVENTION

The present invention relates to controlling access to communication services.

BACKGROUND

Wireless telecommunication carriers, e.g., Sprint, Nextel, Cingular, and other carriers, provide wireless telecommunication services to users using wireless devices by way of communication protocols, e.g., GSM, CDMA, and other wireless protocols. A user is a subscriber of a wireless telecommunication service offered by a wireless telecommunication carrier.

A coverage area refers to a geographic region within which a user obtains wireless telecommunication service from a wireless telecommunication carrier. Telecommunication carrier coverage areas are further divided into home coverage areas and roaming coverage areas. A home coverage area specifies a home region for the user, e.g., a single cellular region for a user. A roaming coverage area includes all other coverage areas outside the home coverage area. The roaming coverage area may include cellular regions outside the home coverage area on a particular carrier and may include cellular coverage provided by a different telecommunication carrier.

In order to provide telecommunication services to a user while the user is in a roaming coverage area, the roaming coverage area telecommunication system communicates with the home coverage area telecommunication system to determine whether to provide service to the user. If the user is determined to have roaming service capabilities, the roaming coverage area telecommunication system provides service to the user while the user is in the roaming coverage area.

Further, different telecommunication systems support different service capabilities. Specifically, different telecommunication switches provide different capabilities as compared to other telecommunication switches.

In another example, a roaming user in a coverage area of a different wireless telecommunication carrier may attempt to obtain wireless service from the different carrier based on an established agreement between the carriers to provide services to users of the carriers in each other's coverage areas. For example, a user of carrier A traveling in an area outside carrier A's coverage area may be able to obtain wireless telecommunication service from carrier B by virtue of an agreement established between carriers A and B.

During the time when a carrier A user is in carrier B coverage area, carrier B provides telecommunication services to the carrier A user. This time period is generally referred to as roaming. In order to provide such services to the roaming carrier A user, carrier B communicates with carrier A in order to identify the user and determine whether the carrier A user should be allowed to obtain service from carrier B.

Current carrier telecommunication systems enable carriers to only allow or deny user access in roaming coverage areas without providing more control over user access to services. Further, carriers may only allow or deny user access to the entirety of the roaming coverage area.

SUMMARY

A method embodiment includes receiving a request for roaming wireless device service information related to a roaming user and determining which services the user has access to for the requesting system, if the user is determined to have access to the requesting system. The method also includes transmitting user service information concerning which services the user has access to regarding the requesting system.

An system embodiment includes a memory, a communication system, and a processing system. The memory stores: (1) user information including a class of service identifier and (2) class of service restriction information. The communication system receives a service request message requesting service for a roaming wireless device. The processing system, coupled with the communication system and the memory, generates a reply message based on comparing information in the service request message with the stored user information in the memory.

An apparatus embodiment includes a memory, a communication system, and a processing system. The memory stores: (1) user information including a class of service identifier and (2) class of service restriction information based on a requesting system capability. The communication system receives a service request message requesting service for a roaming wireless device at a requesting system having a particular capability. The processing system is coupled with the communication system and the memory and generates a reply message based on comparing information in the service request message including the requesting system's particular capability with the stored user information and class of service information in the memory.

Still other advantages of the embodiments will become readily apparent to those skilled in the art from the following detailed description, wherein various embodiments are shown and described, simply by way of illustration of the best mode contemplated of carrying out the invention. As will be realized, the invention is capable of other and different embodiments, and its several details are capable of modifications, all without departing from the scope of the invention.

DESCRIPTION OF THE DRAWINGS

The present invention is illustrated by way of example, and not by limitation, in the figures of the accompanying drawings, wherein elements having the same reference numeral designations represent like elements throughout and wherein:

FIG. 4 is a portion of a graphical user interface useable in conjunction with an embodiment;

FIG. 5 is another example of the FIG. 4 portion of a graphical user interface;

FIG. 6 is another example of the FIG. 4 portion of a graphical user interface;

FIG. 7 is another example of the FIG. 4 portion of a graphical user interface;

FIGS. 8-11 depict additional examples of a portion of a graphical user interface useable in conjunction with an embodiment to specify operator determined barring class of service restrictions;

DETAILED DESCRIPTION

Figure 1:
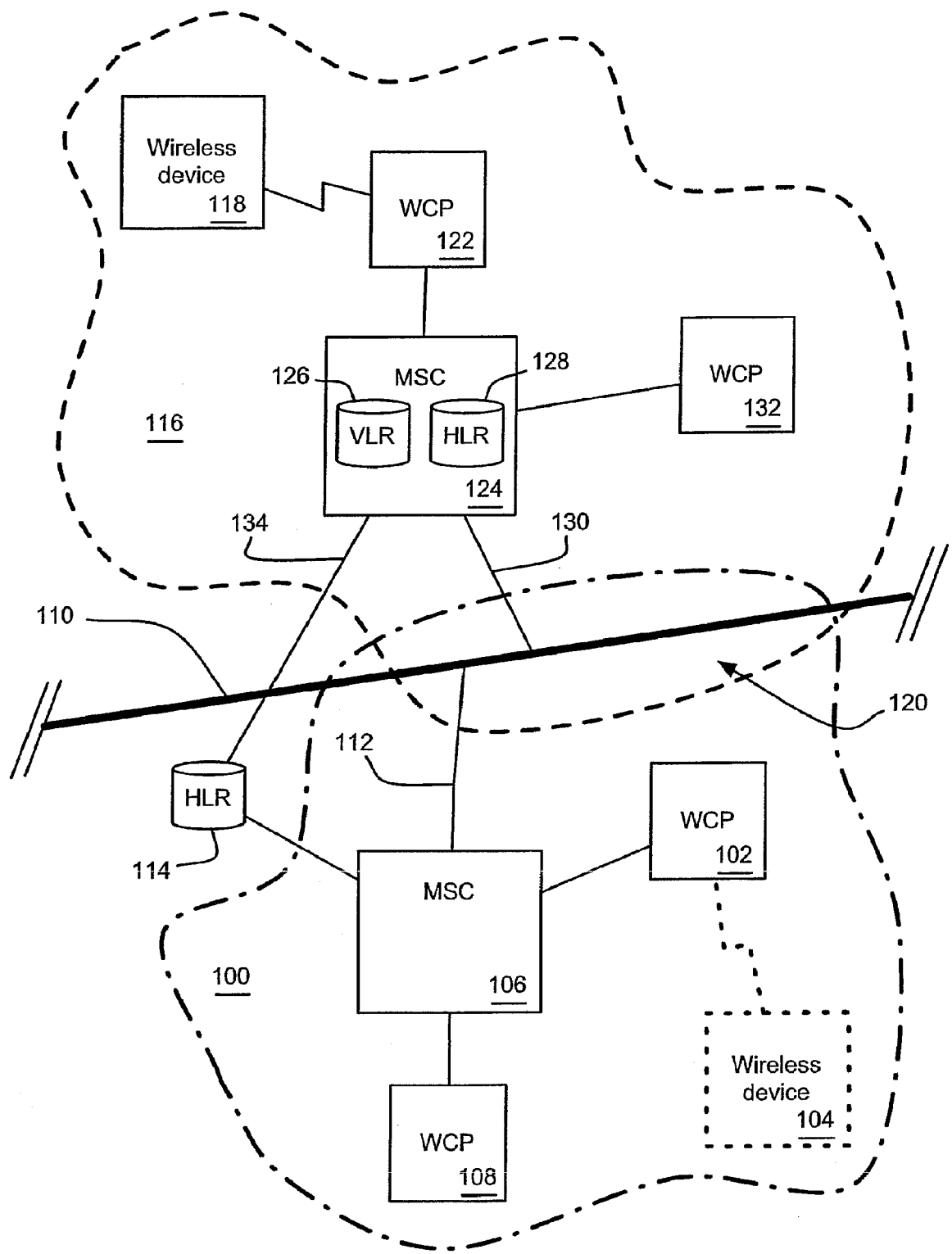
FIG. 1 is a high level network architecture diagram of wireless telecommunication networks usable in conjunction with an embodiment.

The mechanism of the present embodiments enables carriers to control individual services offered to roaming users. Further, embodiments described include the ability for carriers to restrict services allowed on a location basis to roaming users, as well as, the ability for carriers to establish further call restrictions on roaming users based on service classifications. Further still, a second embodiment includes the ability for carriers to control individual services offered to roaming users based upon telecommunication system capability.

According to an embodiment, a roaming wireless device transmits a roaming service request including a unique user identifier, e.g., an E.164 address, telephone number of the user, or other unique identifier including a home network identifier, to a roaming network to which the roaming device is attempting to establish a connection and obtain services, e.g., wireless telecommunication services. An E.164 address is an international public telecommunication numbering plan, i.e., the plan defines the format for telephone numbers. The roaming network transmits a roaming network service request including the unique user identifier to the identified home network, specifically to a predetermined home location register (HLR) in the home network. In a second embodiment, the roaming network service request includes information pertaining to the capability of the roaming network.

Responsive to receipt of the roaming network service request, the home network determines that the roaming wireless device is either: (1) allowed to obtain service from the roaming network; (2) denied service from the roaming network; and (3) restricted to a subset of service from the roaming network.

One type of services available from the roaming network includes customized applications for mobile network enhancement logic (CAMEL) which enables intelligent network functions to be integrated into the network and may extend to serve roaming users. For example, CAMEL enables the allocation of special numbers, fraud control, and prepaid roaming services.

In accordance with an embodiment, the subset service restrictions are determined based on a class of service (COS) designator assigned to the user (i.e., corresponding to the unique user identifier) and stored at the HLR. Based on the COS designator, the services made available to the user are determined based on a CAMEL service designator and/or an operator determined barring (ODB) service designator assigned to the user. If the roaming wireless device is restricted to a subset of service from the roaming network, then one or a combination of both the CAMEL service designator and the ODB service designator is provided to the roaming network and an appropriate connection established between the roaming wireless device and the roaming network. A detailed description of the above-described embodiment is now provided.

In accordance with a second embodiment, the subset service restrictions are determined based on the capability of the roaming network and, in an embodiment, an operator determined barring (ODB) class of service (COS) designator assigned to the particular subset service restrictions for a particular network capability. The subset service restrictions are further determined in combination with a class of service (COS) designator assigned to the user and stored at the HLR. Based on the ODB COS designator, the services made available to the user are determined based on an operator determined barring (ODB) service designator assigned to the network capability. If the roaming wireless device is restricted to a subset of service from the roaming network, then the ODB service designator is provided to the roaming network and an appropriate connection established between the roaming wireless device and the roaming network. A detailed description of the above-described embodiment is now provided.

FIG. 1 depicts a high level network architecture of wireless telecommunication networks usable in conjunction with an embodiment. A first network 100 (dash-dot line), hereinafter referred to as home network, includes a wireless communication point (WCP) 102 to which a wireless device 104 (dotted line) wirelessly connects and a mobile switching center (MSC) 106 handling communication from WCP 102 and accessing information related to wireless device 102 and the user of the wireless device.

Home network 100 may include more than one WCP, as indicated by additional WCP 108, and more than one MSC; however, it will be understood that greater or lesser numbers of WCPs and MSCs may be used in connection with a wireless telecommunication network. For clarity, only a limited number of WCPs and MSCs are discussed herein.

WCP 102 is a wireless connection point, e.g., a cellular communication transceiver and/or router, to which wireless device 104 connects to send and receive communication signals, e.g., audio and video information and data. In order to establish a connection to home network 100, wireless device 104 transmits a unique user identifier which is received by WCP 102. WCP 102 presents the unique identifier to MSC 106 and, in response, the MSC performs a lookup of the identifier in an HLR 114 to which the MSC is connected and determines whether access to network 100 is granted or denied for wireless device 104. Based on the MSC 106 determination with respect to HLR 114, WCP 102 allows or denies a wireless connection with wireless device 104. For example, if the unique user identifier presented by wireless device 104 corresponds to a subscriber of home network 100, as indicated by an entry within the contents of HLR 114, the wireless device may be granted access to the network.

HLR 114 may be a stand-alone accessible data store, e.g., executable software executed by a processing device such as a computer system for storing data and responding to queries. Different embodiments may include the HLR as an integrated part of network 100 and/or other elements of the network such as MSC 106. With respect to FIG. 1, HLR 114 is depicted as outside both home network 100 and roaming network 116 and connected to an MSC within each network 100, 116, described below.

MSC 106 is a telecommunication switch, e.g., a processing device for handling communication transmissions, configured to provide call control, processing, and access to network 100 by users of wireless devices. MSC 106 also provides a point-of-access to a connecting network 110, e.g., the public switched telephone network (PSTN) and other telecommunication networks, via network connection 112 and thereby connects to other users, coverage areas, and communication carriers via wired and wireless connections. In an embodiment, roaming network 116 directly connects with home network 100 without requiring a connecting network.

HLR 114 stores user information for users subscribed to the carrier corresponding to home network 100. User information stored in HLR 114 is maintained by the user's home network carrier and includes user information, e.g., address, account status, and user preferences, described in more detail below. MSC 106 interacts with HLR 114 to determine whether wireless device 104 should be granted access to home network 100.

The upper portion of FIG. 1 depicts a second telecommunication network 116 (hereinafter referred to as roaming network) within which a wireless device 118 is operated by a user who is a subscriber to the carrier operating home network 100. That is, wireless device 118 is said to be roaming within roaming network 116 outside home network 100. The user information for the roaming wireless device 118 is stored in HLR 114. If wireless device 118 moves into an overlapping network coverage area 120, the wireless device may wirelessly connect to either of networks 100, 116, e.g., based on signal strength to a wireless connection point within either network, based on a preference to default to connecting first with the user's home network, and other determining factors. In an embodiment, roaming network 116 is operated by the same carrier as home network 100; however, the roaming network is outside the designated home network of the user.

Roaming network 116 includes a WCP 122 to which roaming wireless device 118 wirelessly connects, similar to WCP 102 described above. Further, roaming network 116 includes an MSC 124, which in turn, includes a visitor location register (VLR) 126 and an HLR 128. MSC 124 and HLR 128 are similar to MSC 106 and HLR 114 described above. In the second embodiment, MSC 124 supports one or more of several sets of CAMEL services. VLR 126 stores information regarding MSC 124 CAMEL phases supported. Each different set of CAMEL services is termed a CAMEL phase, e.g., CAMEL phase 0, phase 1, phase 2, phase 3, and phase 3+. Different MSCs may support different CAMEL phases. As described above, prior approaches did not include the ability to determine connection establishment for a roaming wireless device based on the support CAMEL phase of the MSC to which the wireless device is connecting.

WCP 122 is connected with MSC 124. MSC 124 also provides a point-of-access to fixed network 110, e.g., the public switched telephone network (PSTN), via network connection 130 and thereby connects to home network 100, other users and communication carriers via wired and wireless connections. Network connection 130 provides a connection between roaming network 116 and home network 100, e.g., a connection between MSC 124 and MSC 106. MSC 124 is able to connect and communicate directly with HLR 114 via connection 134.

VLR 126 stores roaming wireless device 118 information, e.g., current location, unique user identifier, and other information, in order to manage requests from users out of the area covered by their home network, e.g., home network 100. In an embodiment, VLR 126 temporarily stores roaming wireless device 118 information for the duration of the wireless device's connection to roaming network 116. After roaming wireless device 118 leaves roaming network 116, VLR 126 removes the stored information related to the roaming wireless device. In an embodiment, VLR 126 waits a predetermined amount of time before removing the stored information. Further still, in an embodiment, VLR 126 removes the stored information in response to a request to remove the information received from HLR 114.

VLR 126 may be a stand-alone accessible data store, e.g., executable software executed by a processing device such as a computer system for storing data and responding to queries. Different embodiments may include the VLR as an integrated part of network 116 and/or other elements of the network such as MSC 124.

Roaming network 116 may include more than one WCP, as indicated by additional WCP 132, and more than one MSC, VLR, and HLR; however, greater or lesser numbers of WCPs, MSCs, VLRs, and HLRs may be used in connection with a wireless telecommunication network. For clarity, only a limited number of WCPs, MSCs, VLRs, and HLRs are discussed herein.

Figure 2:
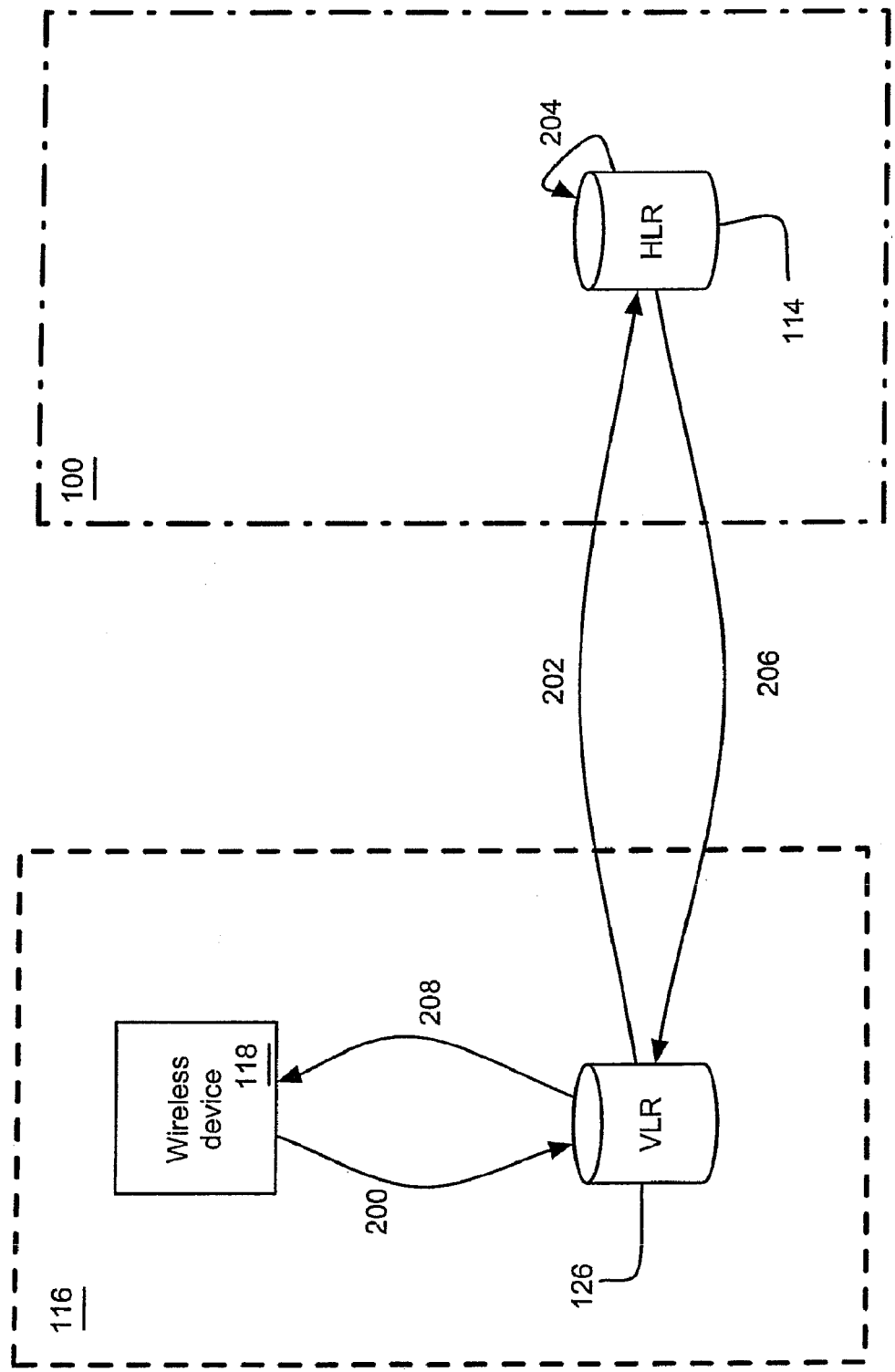
FIG. 2 is a diagram of a COS designator entry fields according to an embodiment.

A brief description of the process for establishing a call from roaming wireless device 118 during the time the device is roaming within roaming network 116 is now provided in conjunction with FIG. 2. After roaming wireless device 118 moves into roaming network 116 coverage area, the roaming wireless device attempts to establish a connection (receive service) with roaming network 116. Wireless device 118 transmits a service request signal 200 to VLR 126 via WCP 122. Transmitted service request signal 200 includes the unique user identifier, e.g., the telephone number of the wireless device, of the user of the wireless device 118 which includes a home network identifier. The home network identifier uniquely identifies the home network of the user, e.g., home network 100, and thereby identifies in which HLR the user's roaming access information is stored, e.g., HLR 114. In an embodiment, the home network identifier is a portion of or derivable based on the unique user identifier.

After receipt of transmitted service request signal 200 from wireless device 118, VLR 126 determines, using the unique user identifier, the HLR of the home network for wireless device 118. VLR 126 transmits a roaming service request 202 for information about the user to the home network corresponding to the home network identifier, specifically to HLR 114 of home network 100, using connection 134.

Specifically, VLR 126 transmits the roaming service request 202 to HLR 114 in order to determine the roaming service capability of the user. In order to identify the location to which returned information regarding the user is to be transmitted, the transmitted roaming service request includes a VLR 126 identifier, e.g., an E.164 address or other identifier of the VLR, in addition to the unique user identifier.

After receipt of the roaming service request from VLR 126, HLR 114 executes a user service query 204 for information related to roaming wireless device 118 based on the unique user identifier. HLR 114 returns a reply message 206 including a query result to VLR 126 indicating either: (1) an allow roaming service message; (2) a deny roaming service message; and (3) a restricted allow roaming service message.

The allow roaming service message indicates that the roaming wireless device 118 is allowed to access all services provided by roaming network 116 and conversely, the deny roaming service message indicates that the roaming wireless device is denied access to all services provided by the roaming network. The restricted allow roaming service message indicates that the roaming wireless device 118 is allowed to access services and features specified by the retrieved user service information corresponding to the unique user identifier and provided in reply message 206 to VLR 126.

Further specifically in an embodiment, the allow roaming service message includes information concerning the user, e.g., a user profile as stored in HLR 114, which includes one or both of CAMEL and ODB specifying user information. The allow roaming service message also includes an HLR-identifying number corresponding to the home HLR of the user, e.g., the E.164 address of HLR 114. The deny roaming service message may include a parameter indicating a reason for denial, e.g., RoamingNotAllowed. The restricted allow roaming service message is similar to the allow roaming service message; however, restricted CAMEL data may not be included in the message. Additionally, ODB restriction information provided in the message may be the ODB information corresponding to the ODB COS ID field 314 (described below in conjunction with FIG. 3) as opposed to ODB information directly corresponding to a user profile.

In particular, as described above, the unique user identifier stored in HLR 114 has a corresponding associated COS designator 300 (FIG. 3) identifying a set of parameters corresponding to services and features to which access is allowed or denied for a particular user. That is, the COS designator enables a telecommunication carrier to specify all of the above query result 204 options (allow, deny, and restricted allow) by assigning a particular COS designator 300 to the user, i.e., the carrier associates a COS designator with a unique user identifier.

In order to determine the particular query result 204 option information to be returned to VLR 126, HLR 114 performs a lookup of the stored particular COS designator entry 300 (FIG. 3) and determines the option information.

In operation, HLR 114 compares the received roaming service request 200 information with one or more of the NoA field 304, number plan field 306, and digit pattern field 308 in order to determine applicability of the COS designator indicated services and restrictions, as further specified in one or more of roaming restriction field 310, HLR screening restriction field 312, and ODB COS ID field 314, to the received request. In a further embodiment, HLR 114 does not perform any comparison with fields 304, 306, 308 and instead applies the specified COS restriction, from one or more of fields 310, 312, 314, to the received request.

After the above-described restrictions for roaming wireless device 118 have been determined, HLR 114 combines the restrictions to produce query result 204. In the case of overlapping or conflicting restrictions, HLR 114 applies the most limiting set of restrictions. In an embodiment, a logical OR operation is performed in order to combine restrictions.

HLR 114 transmits a reply message 206 including query result 204, to the requesting VLR 126, which in turn stores the information.

VLR 126 provides routing information and user service information back to MSC 124 thereby allowing the MSC to locate WCP 122 (shown in FIG. 1) originating the connection. VLR 126 transmits a service request result message 208 to roaming wireless device 118 indicating the results of the query. If roaming service is allowed, then WCP 122 enables roaming wireless device 118 to continue with establishing a connection with MSC 124. If roaming service has been authorized via HLR 114, then wireless device 118 is able to make use of roaming service in roaming network 116, e.g., the user is able to place a call or make use of one or another telecommunication service in roaming network 116, as specified by the CAMEL data and ODB restrictions.

Figure 3:
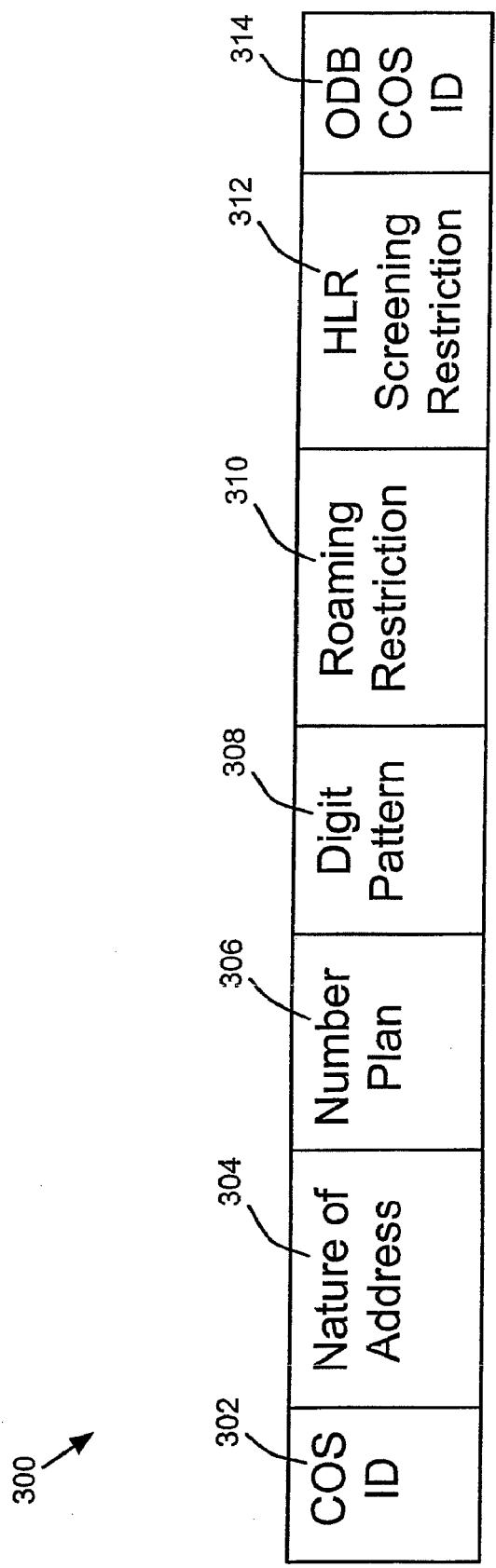
FIG. 3 is a high level message flow diagram according to an embodiment.

FIG. 3 depicts the fields, according to an embodiment, that make up a COS designator entry 300, specifically a COS ID field 302, a nature of address field 304, a number plan field 306, a digit pattern field 308, a roaming restriction field 310, an HLR screening restriction field 312, and an ODB COS ID field 314. COS ID field 302 includes a unique identifier for COS designator entry 300, e.g., a unique series of numeric and/or alphanumeric characters.

Nature of address (NoA) field 304 indicates the type of address for the VLR to which COS designator entry 300 applies. Example field 304 content includes unknown, international number, national significant number, network specific number, subscriber number, abbreviated number, and any nature of address.

Number plan field 306 indicates the numbering plan of the VLR for the particular COS designator entry 300. Example number plan field 306 content includes integrated services digital network (ISDN), data numbering plan (e.g., Comite Consultatif International Téléphonique et Télégraphique (CCITT) Rec X.121), Telex numbering plan (e.g., CCITT Rec F.69), land mobile numbering plan (e.g., CCITT Rec E.212), national numbering plan, private numbering plan, and 'any numbering plan.'

Digit pattern field 308 indicates the VLR address digits for the particular COS designator entry 300. Example digit pattern field 308 content includes one or more occurrences of any character along with a number of patterns for specifying digits, characters, numeric ranges, zero or more alphanumeric characters, a character set, and a fixed length numeric range. Digit pattern field 308 may be used to specify a range of different levels of granularity regarding VLR addresses, e.g., a single VLR address, multiple VLR addresses, and a range of VLR addresses may be specified. For example, a "1." may be entered to specify all VLR addresses beginning with the number 1 and having any number of following digits as signified by the trailing ".". In another example, a "1703." may be entered to specify all VLR addresses beginning with a "1703" and having any number of following digits.

Roaming restriction field 310 indicates whether the user using roaming wireless device 118 and attempting to establish a connection with a particular VLR having an address which matches the digit pattern field 308 is allowed access subject to additional possible restrictions described below with respect to HLR screening restriction field 312 and ODB COS ID field 314 or is denied access to the particular VLR. That is, roaming restriction field 310 has precedence over HLR screening restriction field 312 and ODB COS ID field 314 such that if the roaming restriction field indicates denial of access to the VLR address, HLR 114 does not need to review the further restriction fields 312, 314. If roaming restriction field 310 indicates allowance of access, HLR 114 consults the further restriction fields 312, 314 to determine the information to be provided in query result 206.

HLR screening restriction field 312 indicates the additional restrictions, if any, identified for roaming wireless device 118. Example HLR screening restriction field 312 content includes "no restrictions", "no CAMEL data", "restricted via an ODB COS", and "no CAMEL data and restricted via an ODB COS". If "no restrictions" is indicated in HLR screening restriction field 312, then query result 204 indicates allowed access to roaming network 116 is to be granted to roaming wireless device 118. With respect to the "no restrictions" content, CAMEL data may be returned to VLR 126 if CAMEL data has not been further restricted by other services within HLR 114 and if VLR 126 supports CAMEL phases corresponding to the configured CAMEL data. If "no CAMEL data" is indicated, then query result 204 indicates allowed access to roaming network 116 is to be granted to roaming wireless device 118 without any CAMEL data provided to VLR 126. If "no CAMEL data and ODB COS restrictions" is indicated, then query result 204 indicates ODB restrictions as specified by an ODB COS entry without any CAMEL data being provided.

CAMEL data specifies service information to be provided to VLR 126 and specifying particular service feature capabilities to be afforded the roaming wireless device 118. Because different VLRs support different types of CAMEL services, e.g., different CAMEL phases, CAMEL data is specified according to different possible phases of the destination VLR 126. CAMEL data specification per CAMEL phase is described with respect to FIG. 13 below.

COS ODB ID field 314 specifies a class of service related to operator and/or carrier determined barring restrictions, e.g., preventing all incoming calls, all incoming calls while roaming, all outgoing calls, international outgoing calls, international outgoing calls while roaming, interzonal outgoing calls, all explicit call transfers (ECT), chargeable ECT, international ECT, interzonal ECT, premium rate information calls, premium rate entertainment calls, all packet-oriented services, and similar ODB restrictions, etc. Carriers may restrict a users services using ODB because of user actions, e.g., non-payment for services, etc. As described below with respect to FIG. 13, ODB restrictions may also be applied with respect to CAMEL data. That is, CAMEL data adds functionality for roaming wireless device 118 while ODB restrictions remove functionality for the roaming wireless device.

FIG. 4 depicts a portion of a user interface window 400 usable by carrier personnel to construct and edit a COS designator entry 300 as described above, according to an embodiment. Window 400 includes an upper portion 401 depicting matching criteria for comparison to information in the service request message and a lower portion 402 depicting restriction information for determining the information to be included in the query result 204.

Upper portion 401 displays COS ID field 302, NoA field 304, number plan field 306, and digit pattern field 308. In particular, COS ID field 302 has an identifier value of "0001", NoA field 304 has a value of "." indicating any nature of address meets the criteria, number plan field 306 has a value of "." indicating any numbering plan meets the criteria, and digit pattern field 308 has a value of "1." indicating any VLR address beginning with a 1 meets the criteria. COS ID field 302 is shaded indicating that the value is not able to be modified by the user at this time. In an embodiment, the COS ID field 302 value is automatically generated by HLR 114 in order to maintain uniqueness among all COS ID values.

Based on the foregoing, any user having a COS ID of 0001 and roaming in a roaming network having a VLR address beginning with a value of 1 meets the upper portion 401 matching criteria and HLR 114 uses restriction information presented in lower portion 402 to determine the restrictions to be applied and returned in query result 204.

Lower portion 402 displays roaming restriction field 310, HLR screening restriction field 312, and COS ODB ID field 314. As depicted in FIG. 4, NoA field 304, numbering plan field 306, and HLR screening restriction field 312 are drop-down menu elements presenting a list of possible selections (previously described) for selection by the carrier. In particular, roaming restriction field 310 is checked indicating that roaming wireless device 118 is able to make use of roaming service in roaming network 116 subject to any following restrictions if VLR 126 meets the upper portion 401 matching criteria. Based on HLR screening restriction field 312 value of "0" and no entry in COS ODB ID field 314, there are no restrictions placed on roaming wireless device 118 roaming in connection with matching VLR 126. As stated above, CAMEL data corresponding to the CAMEL phase capability of MSC 124 is provided based on the configuration depicted in FIG. 4.

FIGS. 5-7 depict additional possible settings of lower portion 402 restriction fields of user interface window 400. In particular, FIG. 5 depicts user interface window 400 in a state having roaming restriction field 310 unchecked indicating denial of roaming wireless device 118 to roaming network 116. Because roaming restriction field 310 is unchecked, HLR screening restriction field 312 and COS ODB ID field 314 are grayed out indicating the fields 312, 314 are disabled and unavailable for access by a carrier.

In FIG. 6, user interface window 400 is in a state having roaming restriction field 310 checked and the drop-down menu for HLR screening restriction field 312 in a drop-down state displaying possible menu selections. HLR screening restriction field 312 in the drop-down state covers COS ODB ID field 314.

In FIG. 7, user interface window 400 is in a state having roaming restriction field 310 checked, HLR screening restriction field 312 having a value of "3—Do Not Send CAMEL Data & Restrict Service via ODB COS," and COS ODB ID field 314 having a value of "deny." hi accordance with the COS designator entry depicted in FIG. 7, roaming wireless device 118 is allowed to roam in a roaming network 116; however, restrictions are applied as depicted, i.e., CAMEL data is not transmitted and ODD restriction information corresponding to an ODB restriction having an identifying name of "deny" is transmitted by HLR 114.

Using the above-described embodiment, a carrier is able to restrict services for roaming users and deny connections and services to users located in high fraud and/or theft areas. Further, the carrier is able to enable CAMEL-based features while barring particular call types per ODB restrictions.

FIGS. 8-11 depict a portion of a user interface window 800 usable by carrier personnel to construct and edit an ODB COS entry corresponding to COS ODB ID field 314. Window 800 includes an upper portion 801 depicting the COS ODB ID field 314, as described above, identifying the ODB entry. A lower portion 802 includes a row of tabs 803-806 arranged for specifying ODB restrictions pertaining to the specific COS. Each tab 803-806 corresponds to a particular grouped set of restrictions. FIGS. 8-11 depict example embodiments of user interface window 800 having a respective one of tabs 803-806 selected.

Figure 8:
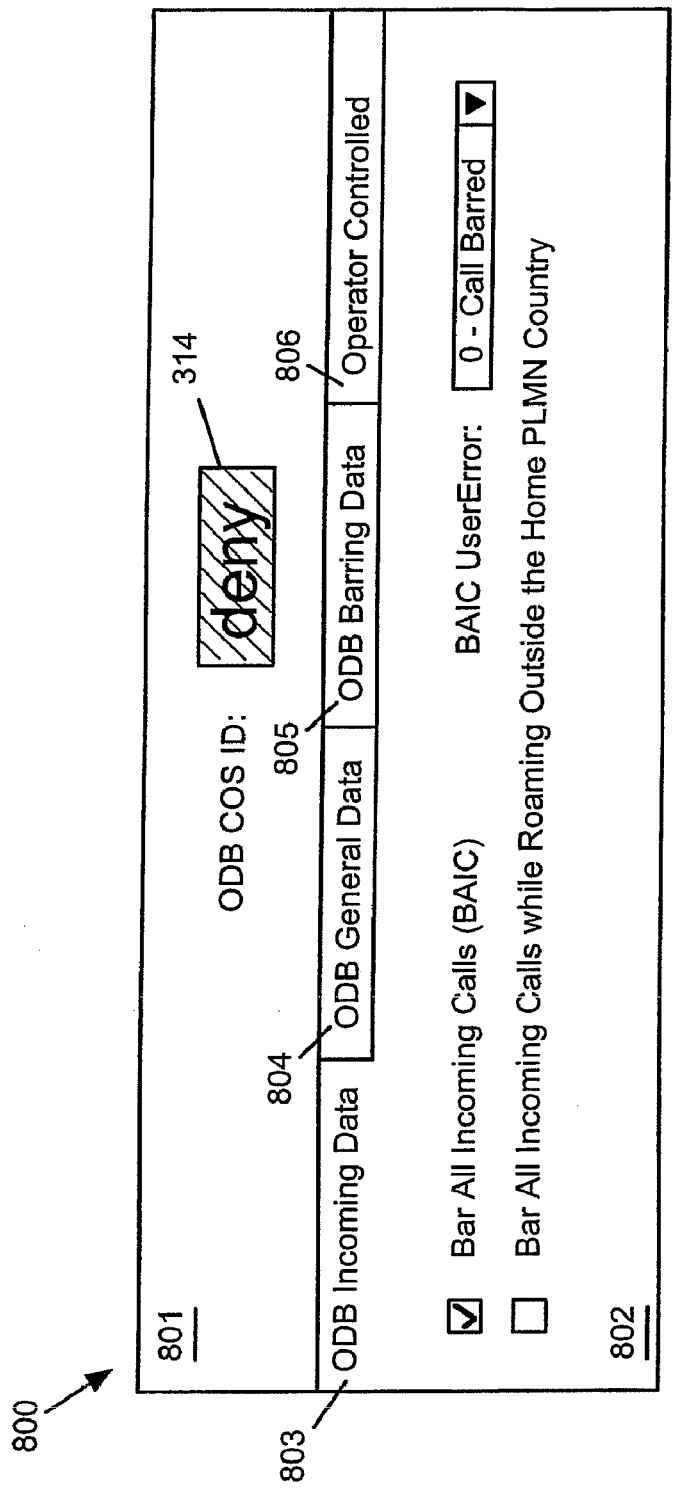

FIG. 8 depicts an ODB Incoming Data tab 803 selected and lower portion 802 depicts example ODB incoming data restrictions for selection and manipulation by a user in order to specify the ODB COS entry.

Figure 9:
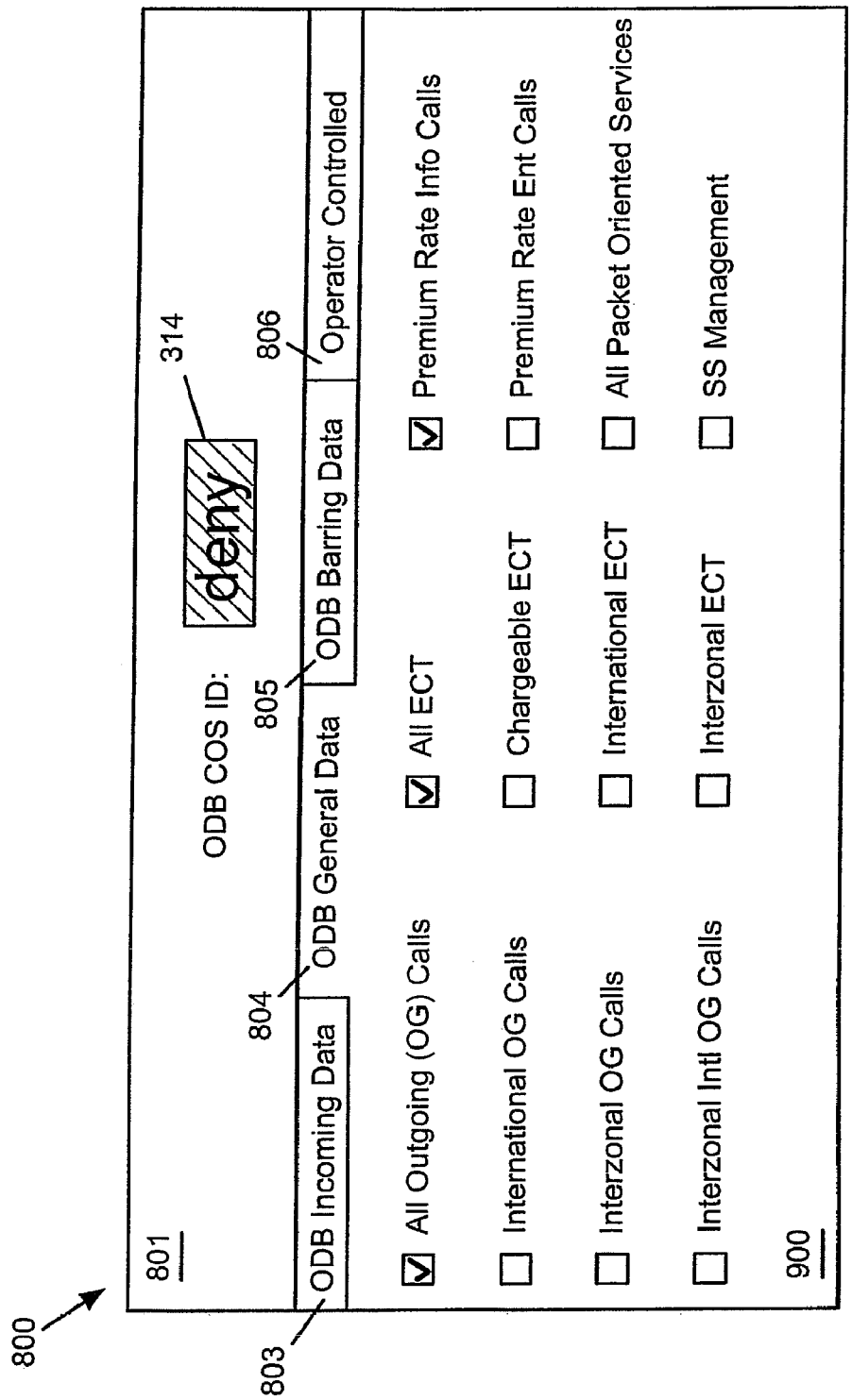

FIG. 9 depicts an ODB General Data tab 804 selected and lower portion 900 depicts example ODB general data restrictions for selection and manipulation by a user in order to specify the ODB COS entry.

FIG. 10 depicts an ODB Barring Data tab 805 selected and lower portion 1000 depicts example ODB barring data restrictions for selection and manipulation by a user in order to specify the ODB COS entry.

Figure 11:
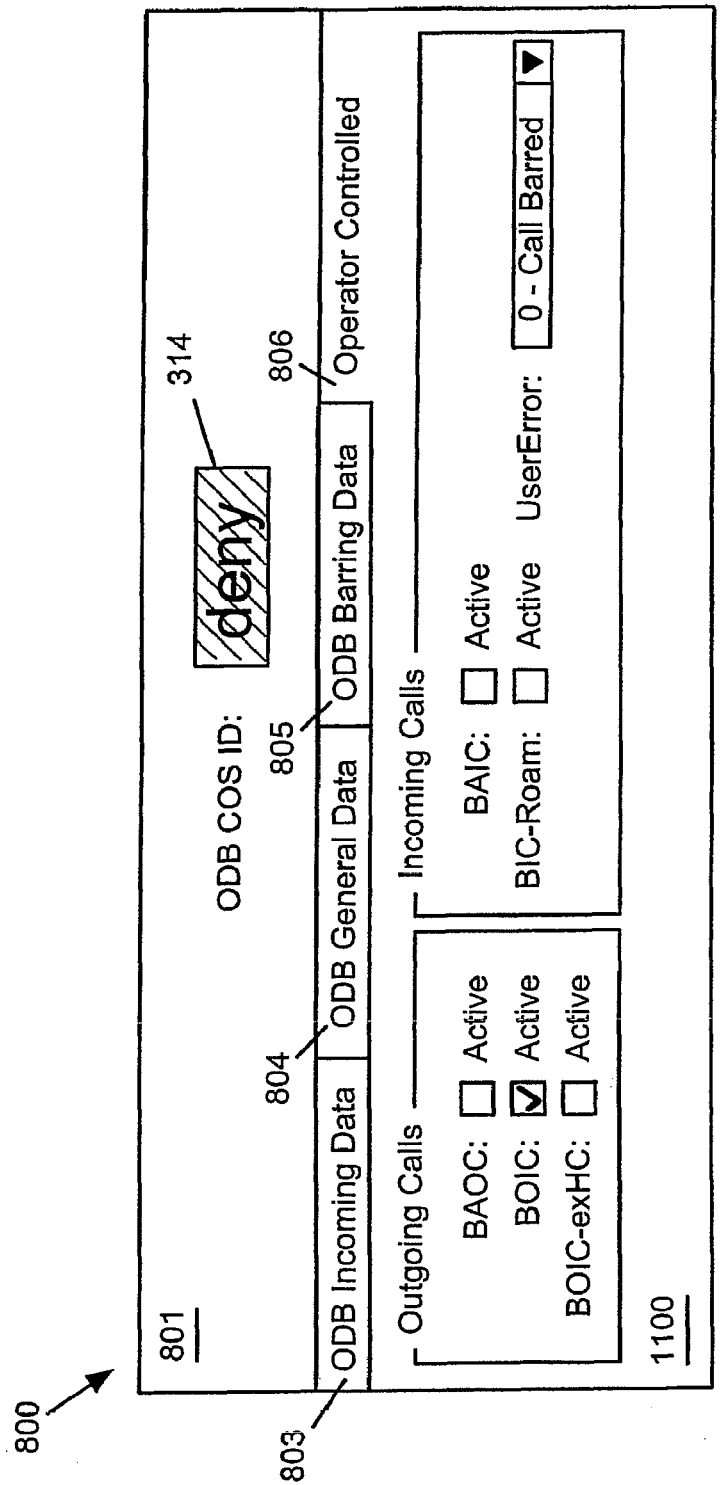

FIG. 11 depicts an Operator Controlled tab 806 selected and lower portion 1100 depicts example operator controlled restrictions for selection and manipulation by a user in order to specify the ODB COS entry.

Figure 12:
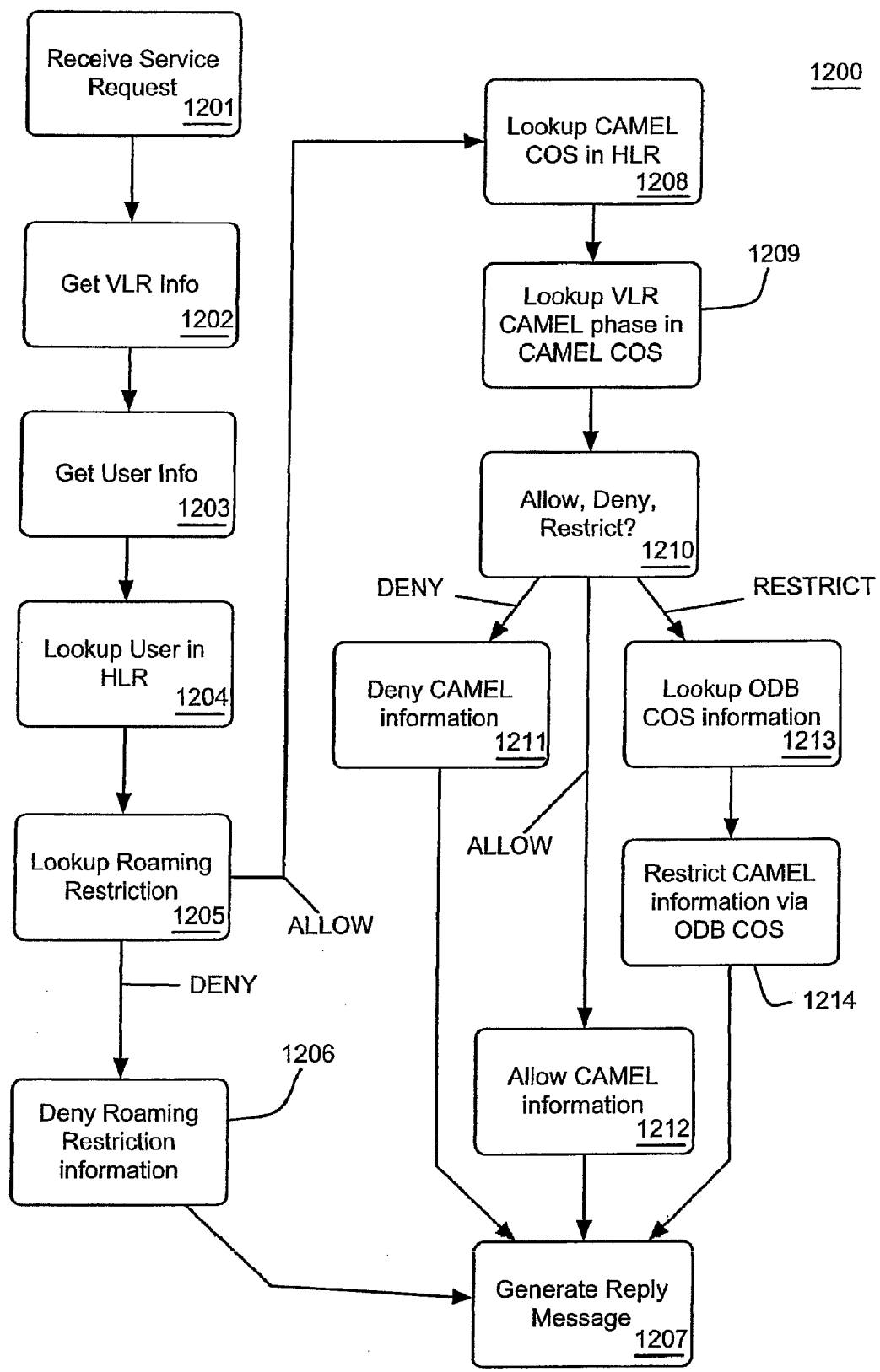
FIG. 12 is a high level diagram of a process flow according to an embodiment.

FIG. 12 depicts a high level process flow diagram of the second embodiment similar to the above-described FIG. 2 operation. In particular, process flow 1200 depicts a portion of executable software, e.g., instructions for execution by a processor, executed by HLR 114. The process flow begins at step 1201 after HLR 114 receives a roaming service request including information related to roaming wireless device 118 requesting roaming service from roaming network 116.

After receipt of the roaming service request, the process flow proceeds to step 1202 and HLR 114 obtains VLR-specific information, e.g., CAMEL phase of VLR 126, from the received roaming service request. The flow proceeds to step 1203 and HLR 114 obtains the unique user identifier from the received roaming service request. The order of steps 1202 and 1203 may be reversed without departing from the scope and spirit of the present embodiments.

The flow proceeds to step 1204 wherein HLR 114 performs a lookup of the unique user identifier in order to determine a COS identifier associated with the user. The flow proceeds to step 1205 and HLR 114 uses the determined COS identifier to determine whether roaming restrictions are in place, e.g., as indicated by roaming restrictions field 310 (FIG. 3 and FIG. 4). If further roaming restrictions do not exist, e.g., checkbox 310 (FIG. 3) is unchecked, the flow proceeds to step 1206 to generate a query result 204 identifying the denial of roaming features for the user. The flow then proceeds to step 1207 and HLR 114 generates a reply message 206 including the generated query result 204 for transmission to VLR 126.

If roaming restrictions do exist, e.g., checkbox 310 (FIG. 3) is checked, the flow proceeds to step 1208. In step 1208, HLR 114 performs a lookup of the CAMEL COS identifier associated with the user and performs a lookup of the corresponding CAMEL COS restrictions to be applied to the user. The flow proceeds to step 1209 and HLR 114 uses the VLR-specific information, i.e., CAMEL phase of VLR 126, obtained in step 1202 in combination with the corresponding CAMEL restrictions from step 1208 to lookup the CAMEL phase-specific restriction information. The flow proceeds to step 1210.

At step 1210, HLR 114 determines whether CAMEL features for the particular phase of VLR 126 is determined to be allowed, denied, or restricted. If the step 1210 determination is to deny CAMEL features for VLR 126, the flow proceeds to step 1211 to generate a query result 204 identifying the denial of CAMEL features, i.e., the non-enablement of CAMEL services. The flow then proceeds to step 1207 and HLR 114 generates a reply message 206 including the generated query result 204 for transmission to VLR 126.

If the step 1210 determination is to allow CAMEL features for VLR 126, the flow proceeds to step 1212 to generate a query result 204 identifying the allowance of CAMEL features. The flow then proceeds to step 1207 and HLR 114 generates a reply message 206 including the generated query result for transmission to VLR 126.

If the step 1210 determination is to restrict the allowable CAMEL features for VLR 126, then the flow proceeds to step 1213 and HLR 114 performs a lookup to determine the ODB COS restrictions applied based on the ODB COS ID field 314. The flow proceeds to step 1214 and HLR 114 generates a query result 204 identifying the restricted features based on the ODB COS for VLR 126. The flow then proceeds to step 1209 and HLR 114 generates a reply message 206 including the generated query result for transmission to VLR 126.

The generated reply message including the generated query result is subsequently transmitted in reply to the roaming service request to VLR 126.

Figure 13:
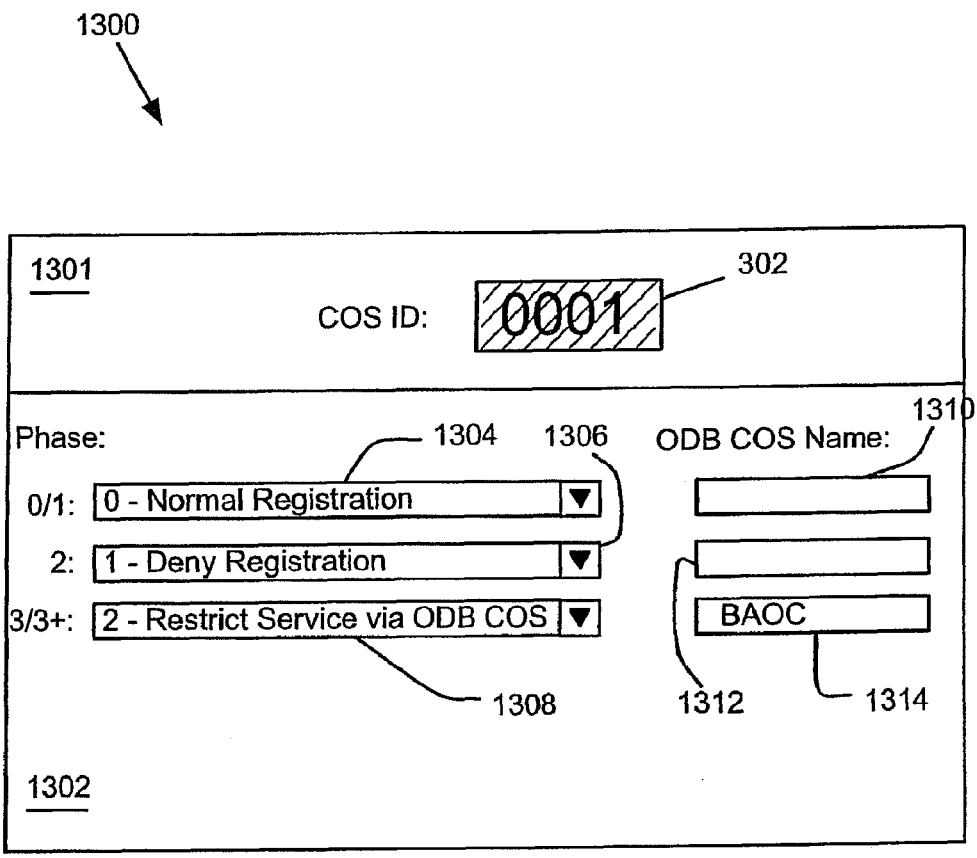
FIG. 13 is a portion of a second graphical user interface usable in conjunction with an embodiment.

FIG. 13 depicts a portion of a user interface window 1300 useable by carrier personnel to construct and edit CAMEL data per CAMEL phase of an MSC as described above in a second embodiment. Window 1300 includes an upper portion 1301 depicting a COS ID field 302, as described above and a lower portion 1302 depicting CAMEL data per CAMEL phase to determine whether additional restrictions are to be included in the query result 204.

Lower portion 1302 displays a CAMEL phase one field 1304, a CAMEL phase two field 1306, a CAMEL phase three field 1308, and respective ODB COS name fields 1310, 1312, 1314. Each of the CAMEL phase fields 1304, 1306, 1308 are drop-down menu elements presenting a list of possible selections, e.g., normal registration, deny registration, and restrict service via ODB COS. In particular, CAMEL phase one field 1304 has a value of "0—Normal Registration" indicating that for a VLR supporting a CAMEL phase 0 or 1 capability, a normal registration is to occur for roaming wireless device 118, e.g., restriction information is obtained from individual user-specified restrictions. Corresponding ODB COS name field 1310 is blank because no ODB COS restrictions were indicated in CAMEL phase one field 1304.

CAMEL phase one field 1306 has a value of "1—Deny Registration" indicating that for a VLR supporting a CAMEL phase 2 capability, CAMEL registration is to be denied for roaming wireless device 118. Corresponding ODB COS name field 1312 is blank because no ODB COS restrictions were indicated in CAMEL phase two field 1306.

CAMEL phase two field 1308 has a value of "2—Restrict Service via ODB COS" indicating that for a VLR supporting a CAMEL phase 3 or 3+ capability, CAMEL registration is to be allowed subject to restrictions specified by an ODB COS with respect to roaming wireless device 118. Corresponding ODB COS name field 1314 includes the value "BAOC" indicating the name of the ODB COS restriction designator to be applied to roaming wireless device 118 with respect to VLR 126.

ODB COS restrictions include operator-applied restrictions preventing certain services and/or features from being access by roaming wireless device 118 user. Examples of ODB COS restrictions include barring all incoming calls, all outgoing calls, international outgoing calls, interzonal outgoing calls, all explicit call transfer (ECT) calls, chargeable ECT calls, international ECT calls, interzonal ECT calls, doubly chargeable ECT, multiple ECT, premium rate information calls, premium rate entertainment calls, signal system (SS) management, all packet oriented services, etc.

Using the above-described embodiment, a carrier is able to restrict services for roaming users based on the CAMEL phase capability of the telecommunication system to which the roaming user is attempting to connect. Further, the carrier is able to enable CAMEL-based features while barring particular call types.

It will be readily seen by one of ordinary skill in the art that the embodiments fulfills one or more of the advantages set forth above. After reading the foregoing specification, one of ordinary skill will be able to affect various changes, substitutions of equivalents and various other aspects of the embodiments as broadly disclosed herein. It is therefore intended that the protection granted hereon be limited only by the definition contained in the appended claims and equivalents thereof.

What is claimed is:

1. A non-transitory computer-readable medium storing instructions which, when executed by a processor, cause the processor to control access to communication services by a roaming wireless device, the instructions comprising instructions to:
receive a request for roaming wireless device service information related to a roaming user;
determine, at a home network of the roaming wireless device, if the user is to have access to the requesting system based on an operator determined barring (ODB) service designator assigned to a subset of service restrictions, and the subset of service restrictions are determined from a class of service (COS) designator assigned to the user and stored in the home network;
if the user is determined to have access to a requesting system, determine, by the home network, to which services the user has access for the requesting system; and
transmit, by the home network, user service information concerning which services the user has access to regarding the requesting system, wherein the instruction to determine which services the user has access is performed based on capabilities of the requesting system.

2. A home location register system for controlling access to communication services by a roaming wireless device, comprising:
a communication system configured to receive a service request message requesting service for a roaming wireless device related to a user, wherein the home location register system is for a home network of the user; and
a processing system operatively coupled with the communication system, the processing system to determine if the user is to have access to a requesting system sending the service request, and in response to determining the user is to have access to the requesting system, determine to which services the user has access based on a capability of the requesting system and to generate a reply message based on the determination,
wherein the services to which a user has access are associated with a class of service identifier, and the class of service identifier corresponds to a predetermined set of matching criteria and restriction information, wherein the matching criteria include at least one of a nature of address indicator, a number plan indicator, and a digit pattern of the requesting system.

3. The system of claim 2, wherein restriction information used to make the determination includes a screening restriction specifying restriction information regarding the user.

4. The system of claim 3, wherein the restriction information further includes a secondary class of service identifier.

5. The home location register system of claim 2, wherein the processing system is to determine if the user is to have access to the requesting system based on an operator determined barring (ODB) service designator assigned to a subset of service restrictions, and the subset of service restrictions are determined from a class of service (COS) designator assigned to the user and stored in the home location register system.

6. An apparatus for controlling access to communication services by a roaming wireless device, comprising:
a communication system configured to receive a service request message requesting service for a roaming wireless device related to a user at a requesting system having a particular capability; and
a processing system of a home network of the user to determine if the user is to have access to the requesting system based on an operator determined barring (ODB) service designator assigned to a subset of service restrictions, and the subset of service restrictions are determined from a class of service (COS) designator assigned to the user and stored in the home network, wherein the processing system is operatively coupled with the communication system, and in response to determining the user is to have access to the requesting system, determine to which services the user has access based on the capability of the requesting system and to generate a reply message based on the determination.

7. The apparatus of claim 6, wherein the capability of the requesting system is specified as a CAMEL phase capability.

8. The apparatus of claim 6, wherein class of service information to be applied to a user is specified using a class of service identifier.

9. The apparatus of claim 8, wherein the class of service identifier corresponds to a predetermined set of matching criteria and restriction information.

10. The apparatus of claim 9, wherein the matching criteria includes a CAMEL phase of the communication system.

11. The apparatus of claim 6, wherein restriction information operable to be used for the determination includes operator determined barring restrictions regarding the user.

* * * * *